US009507164B2

(12) United States Patent
Kim et al.

(10) Patent No.: US 9,507,164 B2
(45) Date of Patent: Nov. 29, 2016

(54) APPARATUS FOR PROJECTING SPACE IMAGE

(71) Applicant: KWANGWOON UNIVERSITY INDUSTRY-ACADEMIC COLLABORATION FOUNDATION, Seoul (KR)

(72) Inventors: Eun-Soo Kim, Seoul (KR); Seung-Cheol Kim, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 155 days.

(21) Appl. No.: 14/300,881

(22) Filed: Jun. 10, 2014

(65) Prior Publication Data

US 2014/0362438 A1  Dec. 11, 2014

(30) Foreign Application Priority Data

Jun. 11, 2013 (KR) .................. 10-2013-0066804

(51) Int. Cl.
*G02B 27/22* (2006.01)

(52) U.S. Cl.
CPC ................................ *G02B 27/2221* (2013.01)

(58) Field of Classification Search
CPC .............. G02B 27/2221; G02B 5/045; G02B 13/0065; H04N 13/0453; H04N 13/0402; H04N 9/3147; H04N 9/3185; H04N 13/00; H04N 13/0445; H04N 5/74; H04N 13/0014; H04N 13/0282; H04N 13/0404; H04N 13/04515; H04N 13/0443; H04N 13/047; H04N 2013/0461; H04N 2213/003; G03B 21/145; G03B 21/60; G03B 21/10; G03B 21/602; G03B 21/62; G03B 21/625; G03B 21/00; G03B 21/56; G03B 37/04
USPC ........... 359/478, 1, 462, 466, 471, 831, 833, 359/834, 837, 838, 839; 353/7–9, 30, 31, 353/33, 37, 81, 98, 99; 348/42, 51
See application file for complete search history.

(56) References Cited

U.S. PATENT DOCUMENTS

2008/0273083 A1* 11/2008 Tomisawa .......... G02B 27/2214
348/51

FOREIGN PATENT DOCUMENTS

| JP | 1999-331863 | 11/1999 |
|---|---|---|
| JP | 2003-216009 A | 7/2003 |
| JP | 2006-208583 A | 8/2006 |
| JP | 2007-206519 A | 8/2007 |
| WO | WO 2006-038509 A1 | 4/2006 |

OTHER PUBLICATIONS

Kitada et al., "Image Reproducer and Hologram Member", JP2003216009, machine translation.*

(Continued)

*Primary Examiner* — Bumsuk Won
*Assistant Examiner* — Wen Huang
(74) *Attorney, Agent, or Firm* — Knobbe Martens Olson & Bear LLP

(57) ABSTRACT

An apparatus for projecting a space image in accordance with an embodiment of the present invention includes: a display unit configured to display an image; and an array of prisms having a plurality of prisms connected with one another to have one lateral planes of the respective prisms form one plane and configured to refract light corresponding to the image through the prisms to a predetermined position at which a user can recognize the image.

4 Claims, 3 Drawing Sheets

(56) References Cited

OTHER PUBLICATIONS

Korean Office Action dated Sep. 12, 2014 for corresponding Korean Application No. 10-2013-0066804.

Korean Office Action dated Nov. 20, 2014 for corresponding Korean Application No. 10-2013-0066804.

Japanese Office Action dated May 19, 2015 received in corresponding Japanese Application No. 2014-119673.

* cited by examiner (a)    (b)    (c)

APPARATUS FOR PROJECTING SPACE IMAGE

CROSS-REFERENCE TO RELATED APPLICATIONS

This application claims the benefit of Korean Patent Application No. 10-2013-0066804, filed with the Korean Intellectual Property Office, on Jun. 11, 2013, the disclosure of which is incorporated herein by reference in its entirety.

BACKGROUND

1. Technical Field

The present invention relates to an apparatus for projecting a space image, more specifically to projecting a space image to a space through a projecting unit.

2. Background Art

A space image renders a depth, unlike a two-dimensional flat image. When the space image is recognized by a person through both eyes, the person can sense a three-dimensional effect. An apparatus for projecting a space image provides the three-dimensional effect, as if the person is looking at an actual object, by projecting the space image as described above. Today, the space image is often projected by 3D display technologies such as a polarization method, a shutter glass method, a parallax barrier method, a lenticular method, etc., but these methods either require a special glasses or restrict the viewing angle. Other methods for projecting a space image include using a convex lens, a concave mirror, a transflective mirror, etc. However, while the convex lens and the concave mirror project the image outside the screen and thus allow the views to touch the image, their viewing angles are quite restricted. Using the transflective mirror has a projecting monitor positioned in the direction of the view, and thus the three-dimensional effect is diminished by the presence of the monitor. Moreover, there are many structural limitations with the transflective mirror. For example, the transflective mirror needs to be positioned at an angle of 45 degrees.

SUMMARY

The present invention also provides an apparatus and a method for allowing an image projected in a space to be viewed, as a screen thereof is vertically positioned and is better utilized.

An aspect of the present invention provides an apparatus for projecting a space image that includes: a display unit configured to display an image; and an array of prisms having a plurality of prisms connected with one another to have one lateral planes of the respective prisms form one plane and configured to refract light corresponding to the image through the prisms to a predetermined position at which a user can recognize the image.

The one plane formed by having the one lateral planes of the respective prisms connected with one another can be perpendicular to a plane of the display unit.

The array of prisms can be placed in between the display unit and the predetermined position at which the user can recognize the image.

The predetermined position at which the user can recognize the image can be provided in plurality, and each of the predetermined positions at which the user can recognize the image can include one or more of the array of prisms.

The array of prisms can have a plurality of prisms having a same size and shape successively and adjacently formed on a transparent film.

The array of prisms can be placed adjacently to a lateral side of the display unit, placed on the display unit, or separated from the display unit.

The array of prisms can have a cylindrical shape formed by having one side edge and the other side edge of the one plane, formed by having the one lateral planes of the respective prisms connected with one another, connected with each other.

According to some embodiments of the present invention, an image projected to a space is visible. Moreover, according to some embodiments of the present invention, a space image can be viewed from every direction.

DETAILED DESCRIPTION

Hereinafter, some embodiments of the present invention will be described in detail with reference to the accompanying drawings. When it is determined that describing certain known configurations or function in detail will evade the gist of this specification, such description will not be provided herein.

Moreover, the elements appeared in the embodiments of the present invention, are independently illustrated to indicate different functions from one another and do not mean that they are constituted as separate hardware or one software unit. In other words, the elements are listed as separate elements for the convenience of description, but it is possible that two or more elements are combined to form one element or that one element is divided into a plurality of elements to perform a function or functions. It shall be appreciated that an embodiment of combined elements or separated elements is also covered by the scope of the present invention as long as it does not escape the gist of the present invention.

Furthermore, some elements are not essential for performing a substantial function in the present invention but are optional for simply improving a function. The present invention can be realized by only including the essential elements for realizing the substance of the present invention and excluding the elements for performance improvement only, and the structure including the essential elements only without the optional elements for simple performance improvement is also covered by the scope of the present invention.

Figure 1:
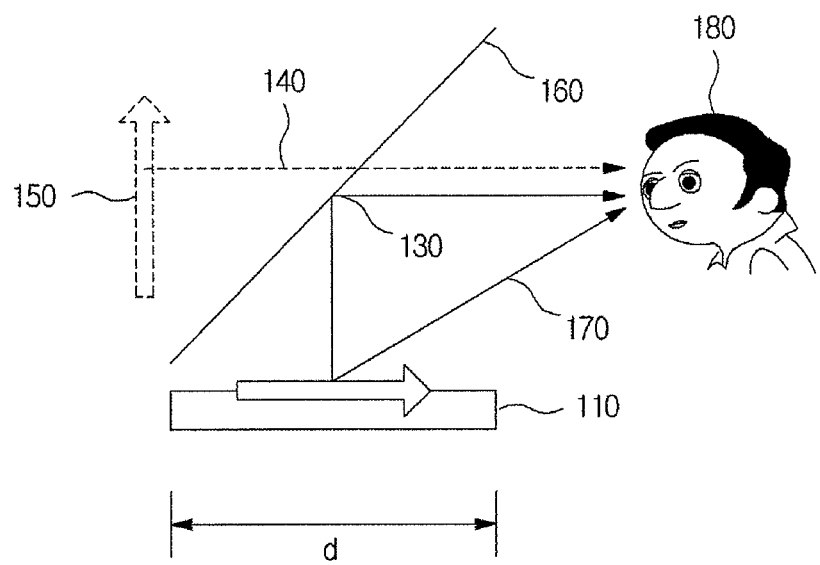
FIG. 1 shows a conventional apparatus for projecting a space image.

FIG. 1 shows a conventional apparatus for projecting a space image.

Referring to FIG. 1, the conventional apparatus for projecting a space image is based on a transflective mirror. A display panel 110 of the apparatus for projecting a space image displays an image 120, which is reflected by a transflective mirror 160 and projected to eyes of a user through a route A 130. The user then perceives that a light has traveled straight through a route B 140 and thus perceives as if an image is projected in a space. Hereinafter, an image at a position 180 perceived by the user will be referred to as a space image 150. In the conventional apparatus for projecting a space image, the user can actually see the light projected directly from the display panel 110 through a route C 170, and thus a sense of reality for the space image 150 is compromised. Moreover, due to structural reasons, a distance between the user and the space image is affected by a size (d) of the display panel 110 of the conventional apparatus for projecting a space image. Furthermore, since the conventional apparatus for projecting a space image uses the transflective mirror 160, a background behind the transflective mirror 160 is still visible in addition to the projected space image 150. As a result, although it is possible to produce an effect of floating in a space, the image projected from the display panel 110 becomes relatively less bright if the background becomes too bright or the display panel 110 becomes dimmer, thereby making the image less visible.

Figure 2:
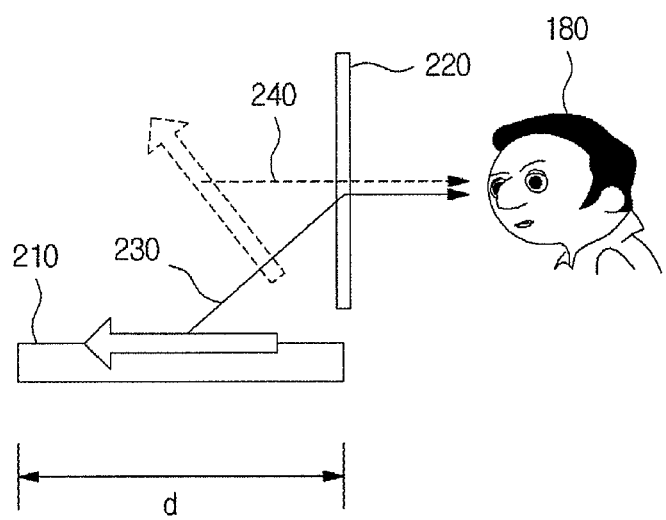
FIG. 2 shows an apparatus for projecting a space image in accordance with an embodiment of the present invention.

FIG. 2 shows an apparatus for projecting a space image in accordance with an embodiment of the present invention.

Referring to FIG. 2, the apparatus for projecting a space image includes a display unit 210 and an array of prisms 220.

The display unit 210 displays an image and projects a light upwardly. Here, the upwardly projected light travels through a variety of straight directions according to a viewing angle of the display unit 210. The light heading to the array of prisms 220 is refracted by the array of prisms 220 and travels toward a user, through a route D 230. Here, the user perceives as if the light projected through the route D 230 is projected through a route C 240.

The display unit 210 can include a display panel, for example, a general-purpose 2D display, which can project images of every direction, or can be a 3D display device that can render a 3D image.

The array of prisms 220 is a structure in which a plurality of identically-shaped prisms are connected with one another and one lateral sides of the connected prisms form one surface (referred to as "array surface" hereinafter). The array of prisms 220 is placed between a position 180 from which the space image can be viewed and the display unit 210. Moreover, the array surface of the array of prisms 220 can be perpendicular to a surface of the display unit 210. Here, the array of prisms 220 can be placed adjacently to a lateral side of the display unit 210, placed on the display unit 210, or separated from the display unit 210.

Here, various shapes and positions of the array of prisms 220 are possible, and the shape and producing steps of the array of prisms 220 will be described with reference to FIG. 3 to FIG. 6.

Moreover, the array of prisms 220 can be substituted with a single prism, but this will increase the size, thickness and weight of the prism.

Figure 3:
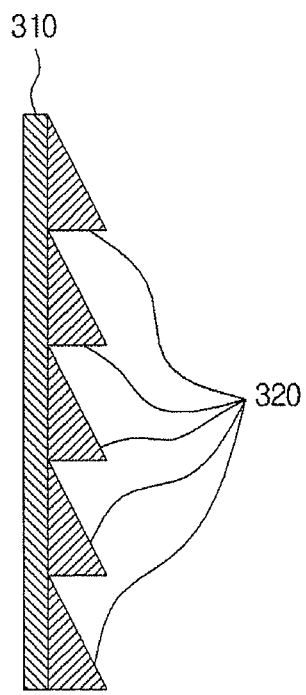
FIG. 3 shows an array of prisms in an apparatus for projecting a space image in accordance with a first embodiment of the present invention.
Figure 4:
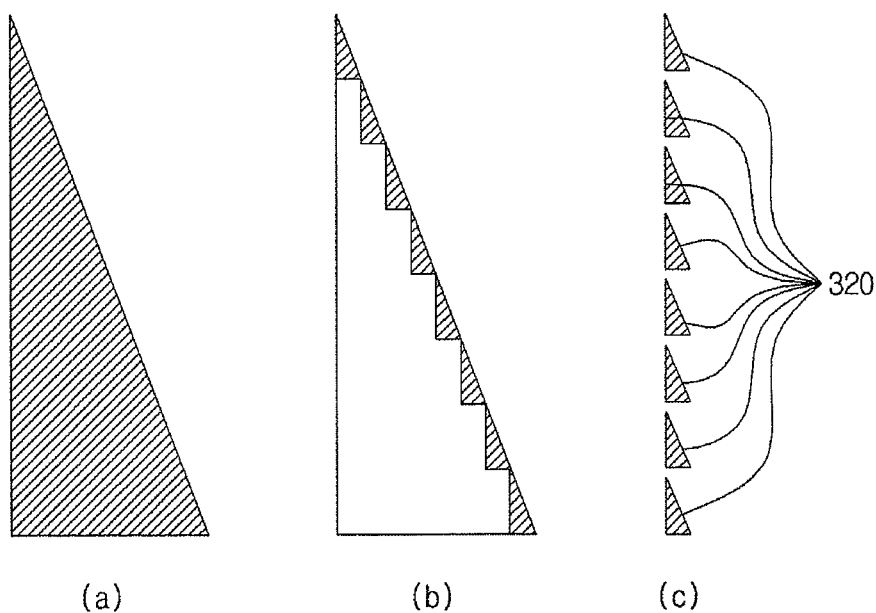
FIG. 4(a), FIG. 4(b) and FIG. 4(c) illustrate the steps for producing the prisms of the apparatus for projecting a space image in accordance with a first embodiment of the present invention.

FIG. 3 shows an array of prisms in an apparatus for projecting a space image in accordance with a first embodiment of the present invention, and FIG. 4 illustrates the steps for producing the prisms of the apparatus for projecting a space image in accordance with a first embodiment of the present invention.

Referring to FIG. 3, an array of prisms 220 in accordance with a first embodiment of the present invention includes a flat transparent film 310 and a plurality of prisms 320

Referring to FIG. 4(a), FIG. 4(b) and FIG. 4(c), the array of prisms 220 in accordance with an embodiment of the present invention can be produced by cutting out an inside of a single prism, as shown in FIG. 4(b), and making a plurality of small prisms, as shown in FIG. 4(c), so that stepped layers are formed inside an inclined plane of the single prism, as shown in FIG. 4(a).

Moreover, it shall be appreciated by those of ordinary skill in the art that the array of prisms 220 can be substituted with a hologram optical element, a diffractive optical element, etc., which have the same optical properties as the array of prisms 220.

Therefore, the array of prisms 220 is smaller and lighter than the single prism and thus has less limitation of installation space. Moreover, since the array of prisms 220 is lighter, the apparatus for projecting a space image can be made lighter and smaller.

Figure 5:
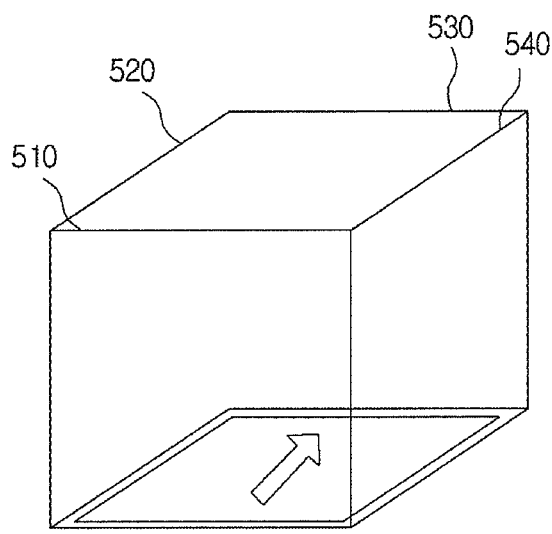
FIG. 5 shows an apparatus for projecting a space image including an array of prisms in accordance with a second embodiment of the present invention.

FIG. 5 shows an apparatus for projecting a space image including an array of prisms in accordance with a second embodiment of the present invention.

Referring to FIG. 5, the array of prisms in accordance with a second embodiment of the present invention has the array of prisms 220 arranged on 4 lateral planes 510-540 of the display unit 210 in the apparatus for projecting a space image in accordance with the first embodiment of the present invention, which has been described above with reference to FIG. 1 to FIG. 4. Accordingly, the user can recognize a space image from different directions. Moreover, it shall be appreciated by those of ordinary skill in the art that, unlike FIG. 5, the number of the arrays of prisms 220 can be varied in such a way that 3 or 5 or more arrays of prisms 220 are arranged on lateral planes or upper planes of the display unit 210.

Figure 6:
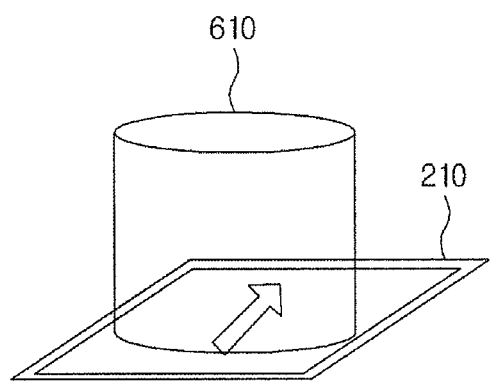
FIG. 6 shows an apparatus for projecting a space image including an array of prisms in accordance with a third embodiment of the present invention.

FIG. 6 shows an apparatus for projecting a space image including an array of prisms in accordance with a third embodiment of the present invention.

The array of prisms in accordance with the third embodiment of the present invention has one side edge and the other side edge of the array of prisms 220, which has been described above with reference to FIG. 3 and FIG. 4, connected with each other to form a cylindrical shape 610 of array of prisms.

With the apparatus for projecting a space image in accordance with the second embodiment of the present invention that has been described with reference to FIG. 5, an image is appeared to be folded at a boundary portion between the arrays of prisms, but the array of prisms in accordance with the third embodiment of the present invention has no image that appears to be folded because of the cylindrical shape of the array of prisms 220.

The embodiments described above include a wide variety of forms. Although it is not possible to describe all possible combinations to illustrate the variety of forms, it shall be appreciated by those who are ordinarily skilled in the art to which the present invention pertains that other combinations are possible. Therefore, it shall be appreciated that the present invention encompasses all other substitutions, modifications and permutations that belong to the claims appended below.

What is claimed is:

1. An apparatus for projecting a space image, comprising:
a display unit configured to display an image via a surface; and
an array of prisms having a plurality of prisms connected with one another to have one set of lateral surfaces of the respective prisms form one surface and configured to refract light corresponding to the image through the prisms to a predetermined position at which a user can recognize the image,
wherein the one surface formed by having the one set of lateral surfaces of the respective prisms connected with one another is perpendicular to the surface of the display unit, and
the array of prisms has a cylindrical shape formed by having one side edge and the other side edge of the one surface connected with each other.

2. The apparatus of claim 1, wherein the array of prisms is placed in between the display unit and the predetermined position at which the user can recognize the image.

3. The apparatus of claim 1, wherein the array of prisms has a plurality of prisms having a same size and shape successively and adjacently formed on a transparent film.

4. The apparatus of claim 1, wherein the array of prisms is placed adjacently to a lateral side of the display unit, placed on the display unit, or separated from the display unit.

* * * * *